United States Patent
Martin et al.

(10) Patent No.: US 8,852,321 B2
(45) Date of Patent: Oct. 7, 2014

(54) COLD-WEATHER RECHARGING DEHYDRATING BREATHER

(75) Inventors: Arthur Martin, Rowlett, TX (US); Jeff Nemec, Oconomowoc, WI (US); Nuwan Rodrigo, Little Elm, TX (US)

(73) Assignee: Waukesha Electric Systems, Inc., Waukesha, WI (US)

( * ) Notice: Subject to any disclaimer, the term of this patent is extended or adjusted under 35 U.S.C. 154(b) by 102 days.

(21) Appl. No.: 13/608,245

(22) Filed: Sep. 10, 2012

(65) Prior Publication Data

US 2013/0061751 A1    Mar. 14, 2013

Related U.S. Application Data

(60) Provisional application No. 61/532,447, filed on Sep. 8, 2011.

(51) Int. Cl.
*B01D 53/26*    (2006.01)

(52) U.S. Cl.
CPC .... *B01D 53/261* (2013.01); *B01D 2259/40096* (2013.01)
USPC ............................................... 95/126; 96/146

(58) Field of Classification Search
CPC ............ B01D 53/261; B01D 2257/80; B01D 2259/40096
USPC ................................................ 95/126; 96/146
See application file for complete search history.

(56) References Cited

U.S. PATENT DOCUMENTS 5,902,381 A    5/1999    Golner et al.
5,968,386 A    10/1999   Goenka et al.

OTHER PUBLICATIONS

International Search Report and Written Opinion issued in related application No. PCT/US2012/054053 on Nov. 5, 2012.

*Primary Examiner* — Christopher P Jones
(74) *Attorney, Agent, or Firm* — Baker & Hostetler LLP (57) ABSTRACT

A recharging dehydrating breather for providing dehydrated air to electrical components includes a desiccant chamber configured to hold desiccant and a heating element configured to heat the desiccant held in the desiccant chamber to at least partially eliminate water. The device further includes a housing configured to hold the desiccant chamber and the heating element, an outlet configured to provide an outlet to guide the water away from the housing, and the outlet configured to be heated by the heating element. A process of configuring a recharging dehydrating breather for providing dehydrated air to electrical components is also disclosed.

20 Claims, 10 Drawing Sheets

COLD-WEATHER RECHARGING DEHYDRATING BREATHER

CROSS-REFERENCE TO RELATED APPLICATIONS

This application claims the benefit from U.S. Provisional Application No. 61/532,447 filed on Sep. 8, 2011, which is hereby incorporated by reference in its entirety for all purposes as if fully set forth herein.

FIELD OF THE INVENTION

The invention relates to a dehydrator for removing moisture from air. More particularly, the invention relates to a recharging dehydrating breather for high power electrical equipment and other devices.

BACKGROUND OF THE INVENTION

FIGS. 1, 2, 3, and 4 depict a known automatic recharging dehydrating breather 100, i.e., the ARDB2 manufactured by Waukesha Electric Systems, Inc. (Waukesha, Wis.). The dehydrating breather 100 typically removes moisture from the air of load tap changer tanks, conservators, sealed tanks, control cabinets and the like. For convenience, the operation of the dehydrating breather 100 will be described with reference to a load tap changer tank which stores oil used to cool the tap changer.

A headspace of the tank of the load tap changer (not shown) is connected to the dehydrating breather 100 by a pipe, tube, hose, etc. When the tank exhales, air flows from the headspace of the tank, through the hose, and into the dehydrating breather 100, which vents the air to the atmosphere. When the tank inhales, air is drawn into the dehydrating breather 100 and passes through a desiccant, then through the hose to the tank. The desiccant dehumidifies the air provided to the tank, and, over time, typically becomes saturated with water. The dehydrating breather 100 removes the water absorbed by the desiccant using a process called recharging or regeneration. During a regeneration cycle, an electric heating element, disposed inside the dehydrating breather 100, evaporates the water from a silica gel desiccant, and an embedded PC board ensures that regeneration occurs only during tank exhalation.

Figure 1:
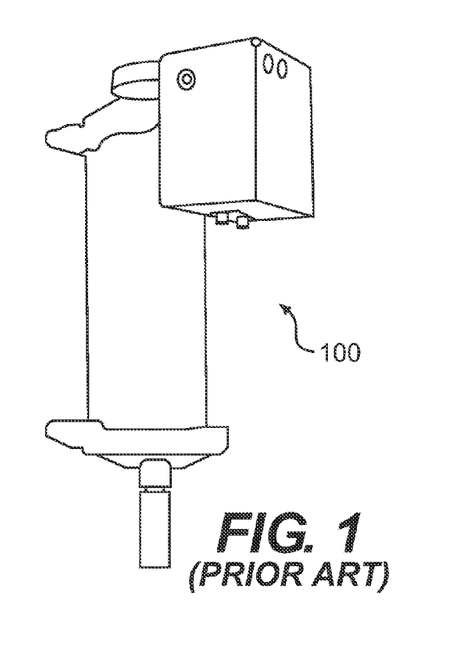
FIG. 1 shows a perspective view of a known recharging dehydrating breather.
Figure 2:
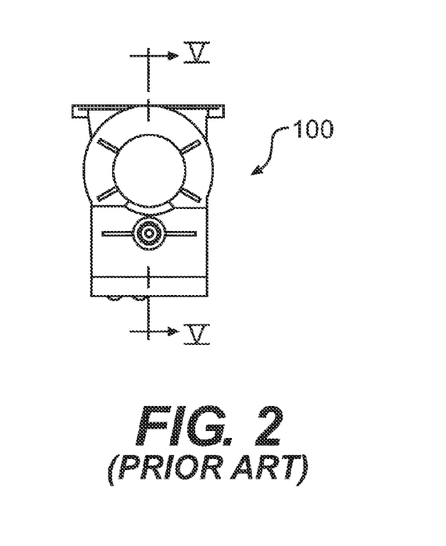
FIG. 2 shows a top view of the known recharging dehydrating breather of FIG. 1.
Figure 3:
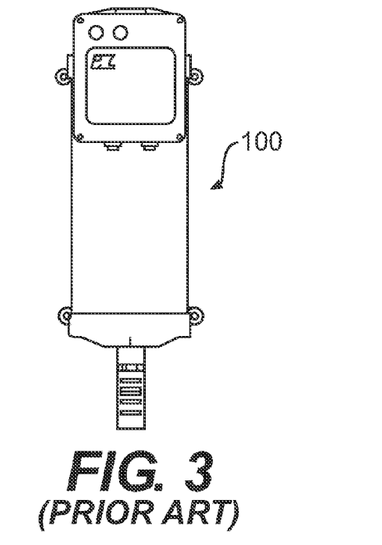
FIG. 3 shows a front view of the known recharging dehydrating breather of FIG. 1.
Figure 4:
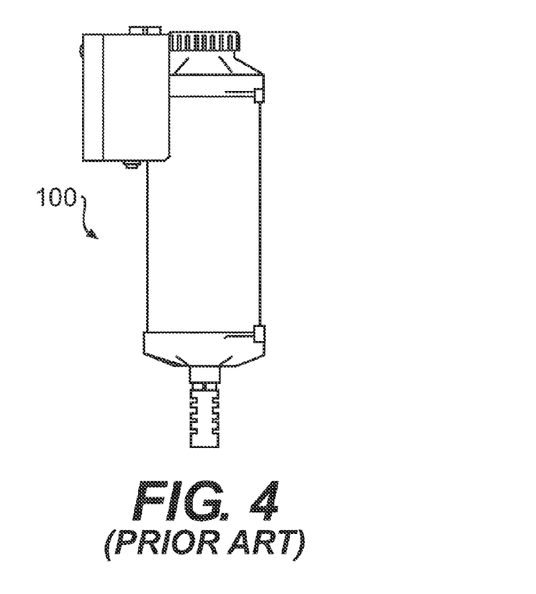
FIG. 4 shows a side view of the known recharging dehydrating breather of FIG. 1.
Figure 5:
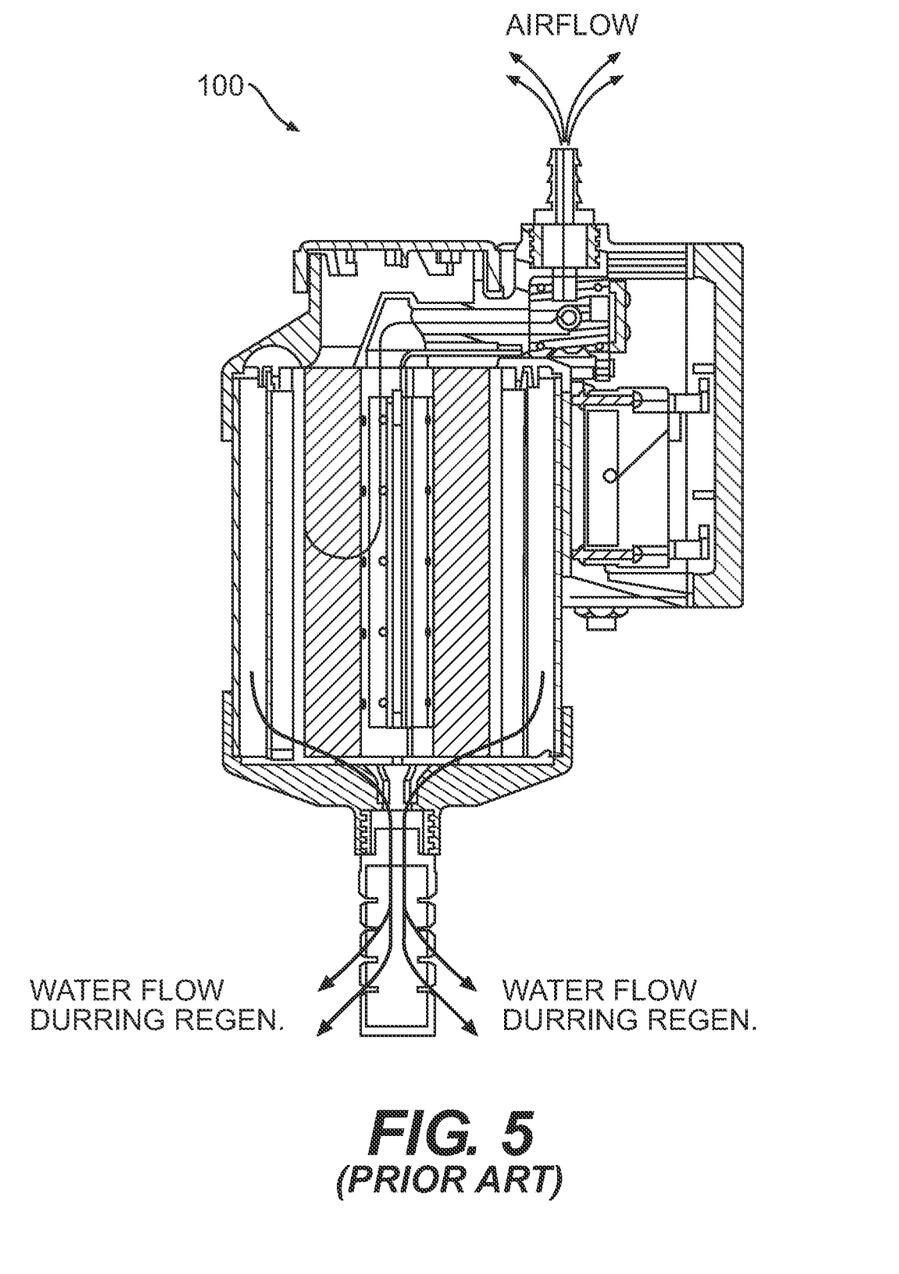
FIG. 5 shows a sectional view (V-V) of the dehydrating breather depicted in FIG. 2.

FIG. 5 depicts a cross-sectional view of a dehydrating breather 100, annotated to identify the various components, air flows and water flow. The dehydrating breather 100 typically includes a bottom molding with a condensate water filter vent (water drain), a tube and a top molding with the PC board and a top cap.

The top molding includes slots through which air is normally drawn into and expelled from the dehydrating breather 100 through a slot. During regeneration, the heating elements evaporate the water absorbed by the silica gel desiccant, which condenses on the inner surface of the tube, drains to the bottom molding and passes through the filter vent.

During cold weather operation, particularly when the ambient air temperature falls below 32° F., water in the filter vent can typically freeze, which prevents additional condensate from draining out and eventually renders the dehydrating breather 100 inoperable due to the build-up of water within the desiccant chamber.

Accordingly, a low cost and/or low complexity solution to prevent the filter vent from freezing is needed.

SUMMARY OF THE INVENTION

The foregoing needs are met, to a great extent, by the invention, wherein in one aspect a technique and apparatus are provided that provides a low cost and/or low complexity solution to the filter vent freezing.

In accordance with one embodiment, a recharging dehydrating breather for providing dehydrated air to electrical components includes a desiccant chamber configured to hold desiccant, a heating element configured to heat the desiccant held in the desiccant chamber to at least partially eliminate water, a housing configured to hold the desiccant chamber and the heating element, an outlet configured to provide an outlet to guide the water away from the housing, and the outlet configured to be heated by the heating element.

In accordance with another embodiment a recharging dehydrating breather for providing dehydrated air to electrical components includes chamber means for holding desiccant, heating means for heating the desiccant held in the chamber means to at least partially eliminate water, means for housing the chamber means and the heating means, outlet means to provide an outlet to guide the water away from the housing means, and the outlet means being heated by the heating means.

In accordance with yet another embodiment, a process of configuring a recharging dehydrating breather for providing dehydrated air to electrical components includes holding a desiccant in a chamber, heating the desiccant held in the chamber with a heating element to at least partially eliminate water, housing the chamber and the heating element in a housing, arranging an outlet to guide the water away from the housing, and heating the outlet with the heating element.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

The invention will now be described with reference to the drawing figures, in which like reference numerals refer to like parts throughout. Embodiments of the invention advantageously provide a recharging dehydrating breather that operates in cold weather by reducing or eliminating frost and ice formation within the condensate water flow path of the dehydrating breather without substantially increasing the complexity, cost, power requirements, failure rate, etc., of the device.

In one aspect, the recharging dehydrating breather may include a desiccant chamber, a heating element, and a water outlet that is heated by the heating element.

In a further aspect, the recharging dehydrating breather may include a desiccant chamber, a thermal conductor, and a condensate vent. The desiccant chamber may include desiccant and a heater. The thermal conductor may be thermally coupled to the heater and may include a water inlet fluidly coupled to the desiccant chamber, a central bore, and a water outlet. The condensate vent 230 may include a central bore fluidly coupled to the thermal conductor water outlet and a screen may be disposed over the water outlet. In another aspect, the recharging dehydrating breather also may include a thermal coupler with a disc that abuts a bottom of the heater and a threaded shaft that may be threaded into a threaded upper portion of the thermal conductor central bore.

Figure 6:
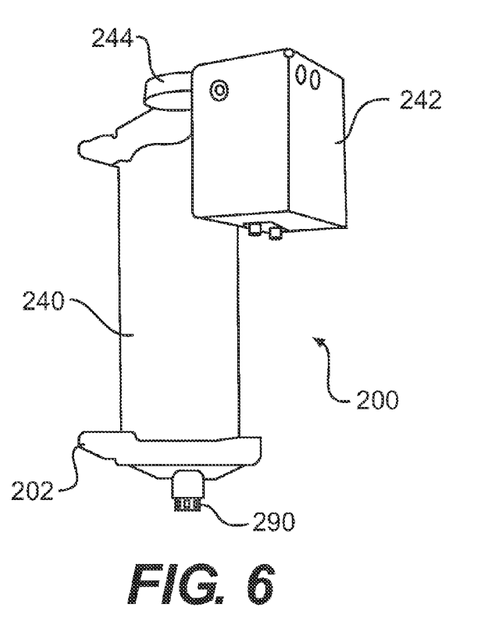
FIG. 6 shows a perspective of a recharging dehydrating breather according to an aspect of the invention.
Figure 7:
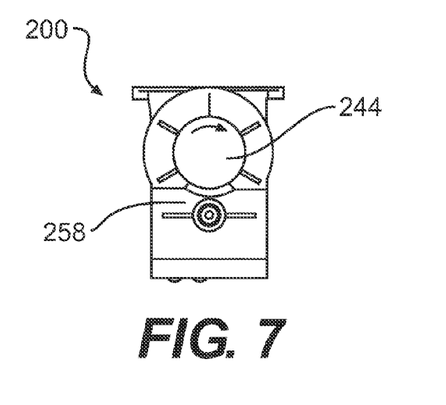
FIG. 7 shows a top view of a recharging dehydrating breather according to the aspect of the invention of FIG. 6.
Figure 8:
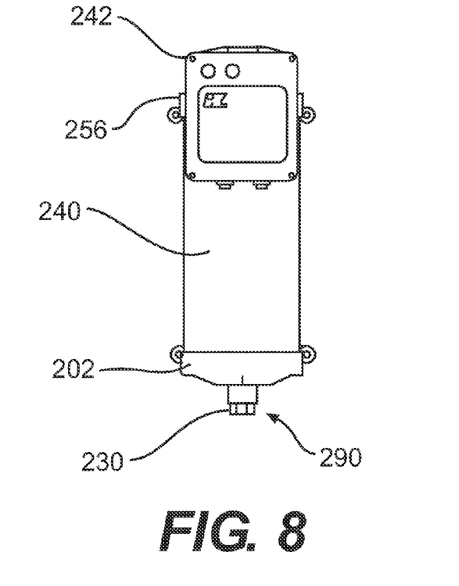
FIG. 8 shows a front view of a recharging dehydrating breather according to the aspect of the invention of FIG. 6.
Figure 9:
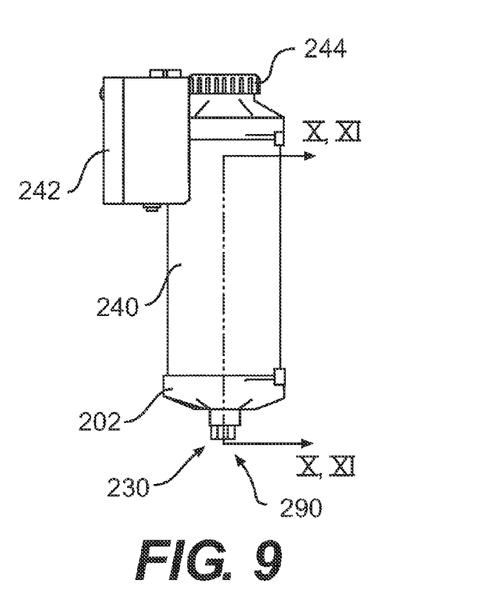
FIG. 9 shows a side view of a recharging dehydrating breather according to the aspect of the invention of FIG. 6.

FIG. 6 shows a perspective of a recharging dehydrating breather according to an aspect of the invention; FIG. 7 shows a top view of a recharging dehydrating breather according to the aspect of the invention of FIG. 6; FIG. 8 shows a front view of a recharging dehydrating breather according to the aspect of the invention of FIG. 6; and FIG. 9 shows a side view of a recharging dehydrating breather according to the aspect of the invention of FIG. 6. In particular, FIGS. 6, 7, 8, and 9 show the details of a dehydrating breather 200. The dehydrating breather 200 may include a body 240, an upper housing 242 with an electric controller, and a removable cap 244. The lower housing 202, body 240, and upper housing 242 may be each made from plastic, such as a polycarbonate or similar material, or, alternatively, metal or metal alloy, or the like.

A component that requires dehydrated air, such as the headspace of the tank of the load tap changer, may be connected to the dehydrating breather 200 by a connector such as pipe, tube, hose, or the like. When the component exhales, air flows from the component, through the connector, and into the dehydrating breather 200, which vents the air to the atmosphere. When the component inhales, air is drawn into the dehydrating breather 200 and passes through a desiccant, then through the connector to the component. The desiccant dehumidifies the air provided to the component, and, over time, may become saturated with water. The dehydrating breather 200 may remove the water absorbed by the desiccant using a process called recharging or regeneration.

Figure 10:
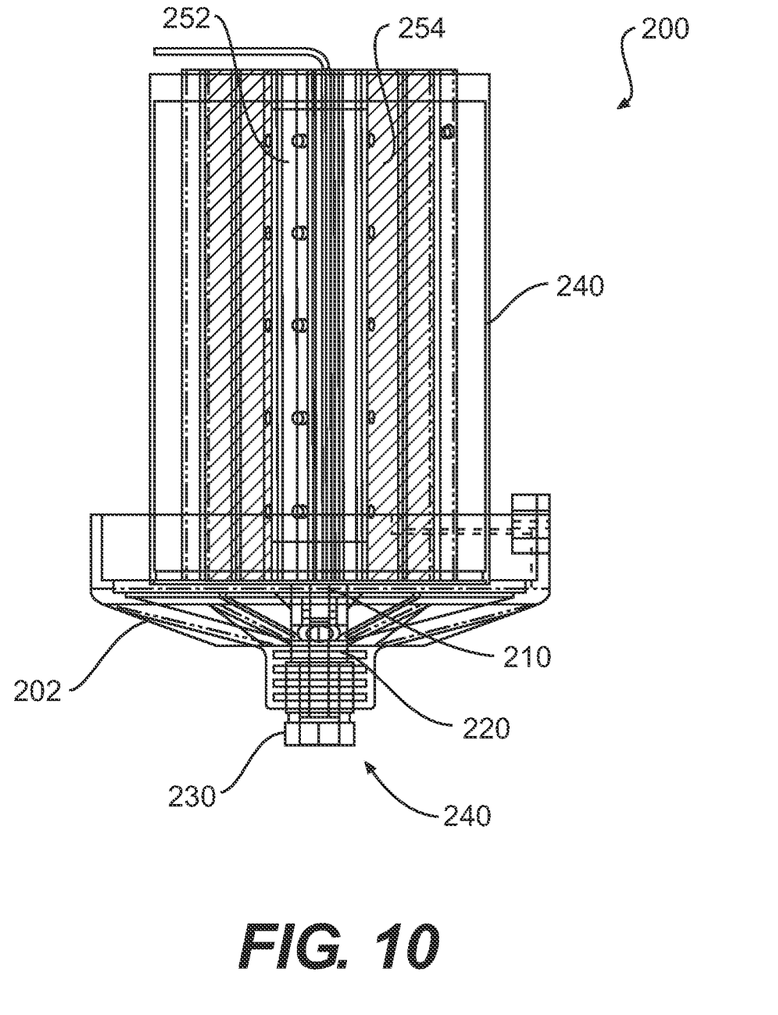
FIG. 10 shows a partial sectional view (X-X) of the dehydrating breather depicted in FIG. 9.
Figure 11:
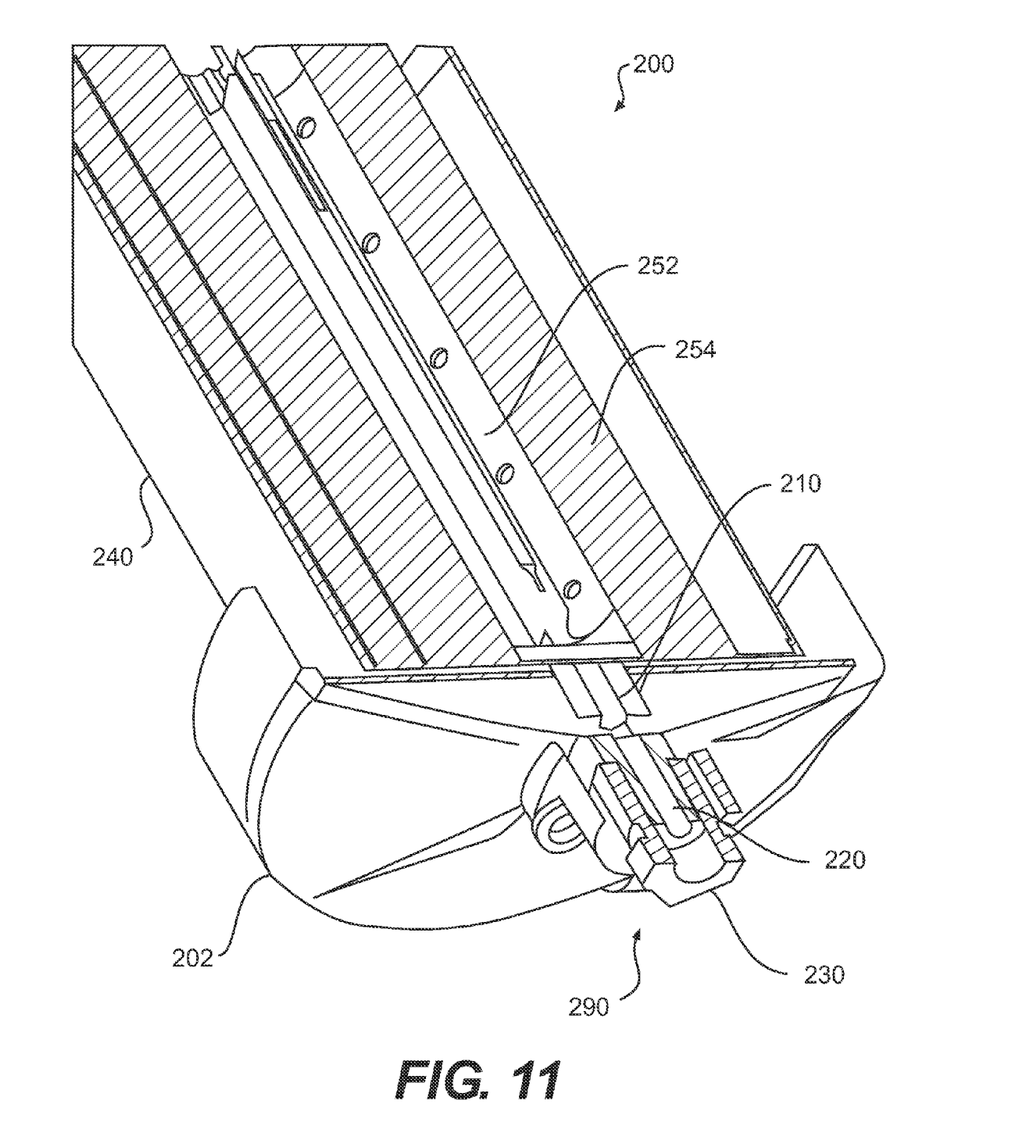
FIG. 11 shows a partial perspective sectional view (XI-XI) of the dehydrating breather depicted in FIG. 9.
Figure 12:
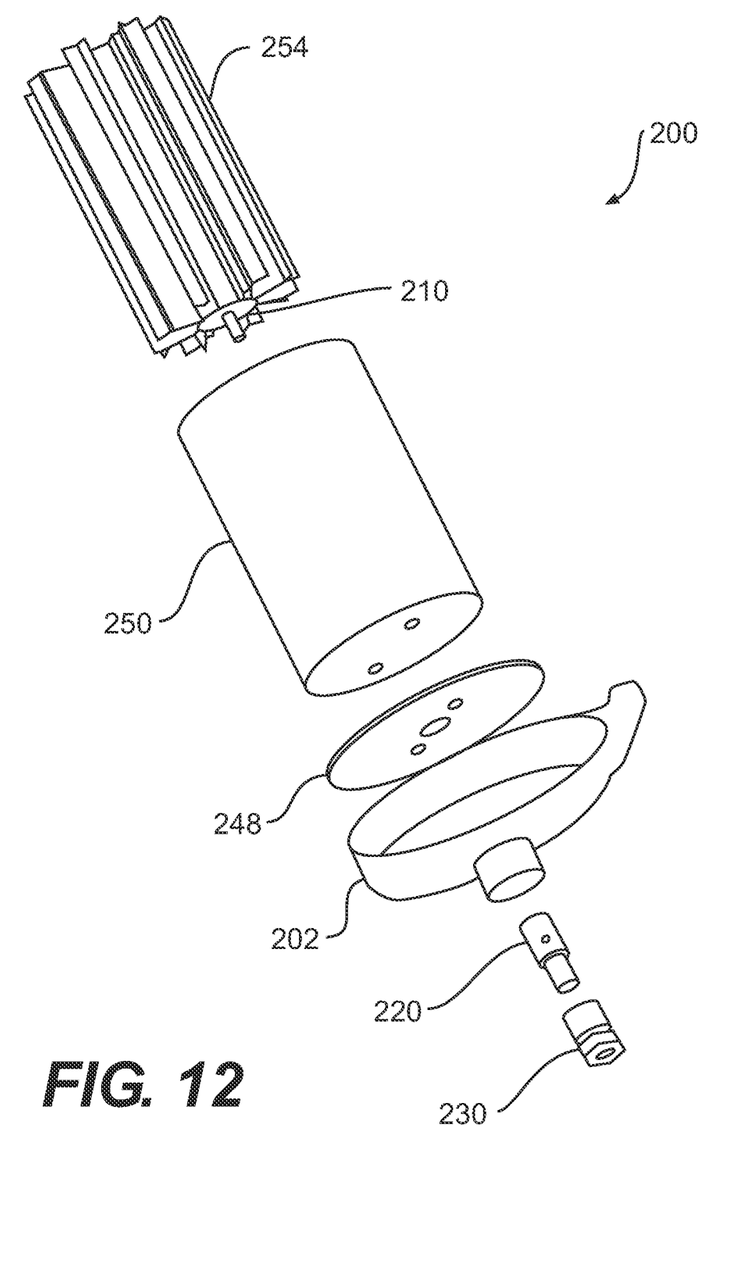
FIG. 12 shows a partial exploded view of the dehydrating breather depicted in FIG. 6.

FIG. 10 shows a partial sectional view (X-X) of the dehydrating breather depicted in FIG. 9; FIG. 11 shows a partial perspective sectional view (XI-XI) of the dehydrating breather depicted in FIG. 9; and FIG. 12 shows a partial exploded view of the dehydrating breather depicted in FIG. 6. During a regeneration cycle, a heating element 252, disposed inside the dehydrating breather 200 may evaporate the water from the desiccant by heating the same. Thereafter, the evaporated water may condensate within the dehydrating breather 200 and be directed to an outlet 290. Portions of the water outlet are heated by the heating element 252 and accordingly freezing of the water and/or frosting is less likely to occur during cold weather.

The dehydrating breather 200 may include the lower housing 202. The outlet 290 may include one or more of a thermal coupler 210, a thermal conductor 220, and a condensate vent 230.

During a regeneration cycle, the heating element 252, disposed inside the dehydrating breather 200 may evaporate the water from the desiccant by heating, and a controller may ensure that regeneration occurs only during component exhalation.

The upper housing 242 may include a slot or vent port 256 through which air is normally drawn into and expelled from the dehydrating breather 200 and through a tank port 258. A solenoid valve may couple the tank port 258 to either the desiccant chamber 246 or the vent port 256. During normal operation, the solenoid valve may couple the tank port 258 to the desiccant chamber 246, and the component inhales and exhales through the vent port 256 and desiccant chamber 246. During regeneration, the solenoid valve may couple the tank port 258 to the vent port 256 to allow the component to exhale, and energizes the heating element 252 to evaporate the water absorbed by the desiccant, which condenses on the inner surface of the body 240, drains to the lower housing 202 and passes through the outlet 290 such as the condensate vent 230. If the component attempts to inhale during regeneration, the controller may suspend regeneration and the solenoid valve couples the tank port 258 to the desiccant chamber 246.

The desiccant chamber 246 may be located in the body 240. In one aspect, the desiccant chamber 246 may include a cylindrical, perforated metal sleeve 250 that may be centrally located within the body 240 and may rest upon a screen/filter 248 located just above the lower housing 202. The metal sleeve 250 and the screen/filter 248 may form the desiccant chamber 246.

The desiccant chamber 246 may include one or more of the heating element 252 and a heat distribution fin assembly 254. Additionally, the desiccant chamber 246 may hold the desiccant that may be a silica gel desiccant. However, other types of desiccants are contemplated as well. The silica gel desiccant is not shown in order to simplify the figures herein. However, the silica gel desiccant will fill the voids between the heat distribution fin assembly 254 and the heating element 252 that exist in the space located in the metal sleeve 250.

In a particular aspect, the outlet 290 may include the thermal coupler 210 attached to, or abutting, the bottom of the heating element 252 and/or the heat distribution fin assembly 254 in order to conduct thermal energy or heat generated during the regeneration process to the thermal conductor 220 and, to a lesser extent, condensate vent 230. The thermal coupler 210 may be attached to the thermal conductor 220 using a threaded or keyed connection, a press fit, or the like. However, other types of physical and mechanical connections are contemplated as well. The thermal coupler 210 and thermal conductor 220 may be made from materials with good to excellent thermal conductivity, such as, for example, brass, copper, aluminum, steel, and the like. In one aspect, the thermal coupler 210 is aluminum and the thermal conductor 220 is copper. The condensate vent 230 may be attached to the lower housing 202 using a threaded connection, and may be made from stainless steel, although other materials are contemplated.

During regeneration, thermal energy or heat flows from the heating element 252 to the outlet 290. This level of heat tends to prevent condensate water flowing through the outlet 290 from freezing, and, to a lesser extent, to prevent frost or ice from forming on the exterior surfaces of the outlet.

In a particular aspect, thermal energy or heat flows from the heating element 252 to the thermal conductor 220, via the thermal coupler 210. This level of heat tends to prevent condensate water flowing through the thermal conductor 220 and out of the condensate vent 230 from freezing, and, to a lesser extent, to prevent frost or ice from forming on the exterior surfaces of the condensate vent 230.

Figure 13:
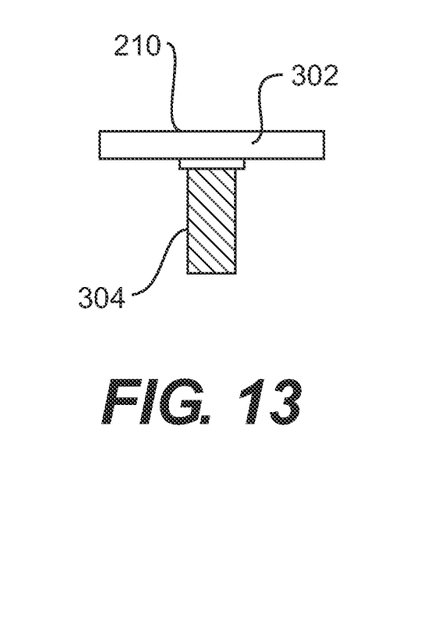
FIG. 13 shows a side view of a thermal conductor according to an aspect of the invention.
Figure 14:
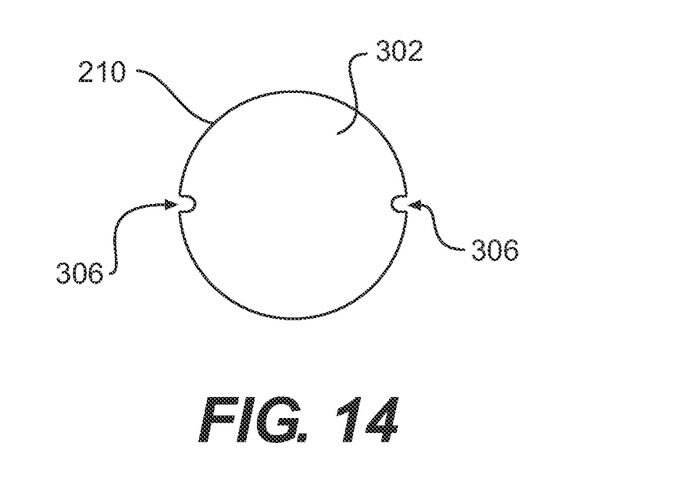
FIG. 14 shows a top view of the thermal conductor according to the aspect of the invention shown in FIG. 13.

FIG. 13 shows a side view of a thermal conductor according to an aspect of the invention; and FIG. 14 shows a top view of the thermal conductor according to the aspect of the invention shown in FIG. 13. In particular, FIGS. 13 and 14 present side and top views, respectively, of the thermal coupler 210 according to an aspect of the invention. The thermal coupler 210 may include a disk 302 and a threaded shaft 304. The disk 302 may contact the heating element 252 or otherwise be in a thermally conductive relationship with the heating element 252. Accordingly, the heat generated by the heating element 252 may be transferred to the thermal coupler 210, and more specifically, may be transferred to the disk 302. Thereafter, the heat may be transferred to the threaded shaft 304. The threaded shaft 304 may be threaded and may extend downwardly from the disk 302. The disk 302 may include one or more notches 306 to align with corresponding structure on a bottom of the heating element 252. Other constructions of the thermal coupler 210, threaded shaft 304, and disk 302 are also contemplated by the invention and are within the spirit and scope of the same.

Figure 15:
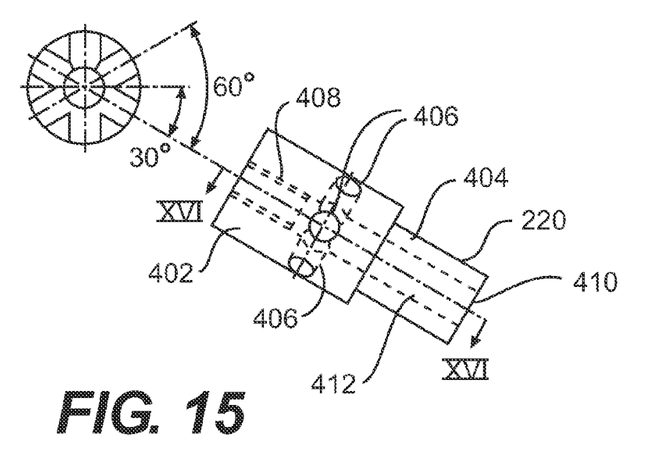
FIG. 15 shows a sectional view (XV-XV of FIG. 16) and a perspective view of a thermal conductor according to an aspect of the invention.
Figure 16:
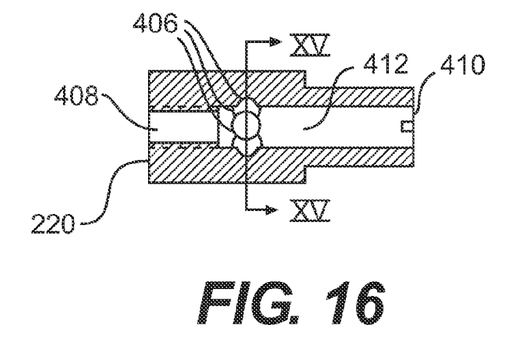
FIG. 16 shows a sectional view (XVI-XVI) of the thermal conductor according to the aspect of the invention shown in FIG. 15.
Figure 17:
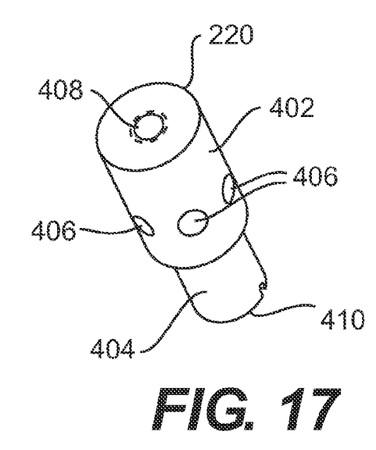
FIG. 17 shows a perspective view of a thermal conductor according the aspect of the invention shown in FIG. 15.

FIG. 15 shows a sectional view (XV-XV of FIG. 16) and perspective view of a thermal conductor according to an aspect of the invention; FIG. 16 shows a sectional view (XVI-XVI) of the thermal conductor according to the aspect of the invention shown in FIG. 15; and FIG. 17 shows a perspective view of a thermal conductor according the aspect of the invention shown in FIG. 15. In particular, FIGS. 15, 16 and 17 present side and sectional, sectional and perspective views, respectively, of the thermal conductor 220 according to an aspect of the invention. The thermal conductor 220 may have a cylindrical upper portion 402, a cylindrical lower portion 404 and a central bore 408, 412 extending therethrough as shown by the dashed lines. The thermal conductor 220 is also contemplated to have other shaped configurations.

A diameter of the cylindrical upper portion 402 may be greater than a diameter of the cylindrical lower portion 404 (as illustrated), or vice versa, or the diameters can be the same. In one aspect, the upper portion of the central bore 408 may be threaded to receive the threaded shaft 304 of the thermal coupler 210, while the middle and lower portions of the central bore 412 may be smooth to facilitate condensate water flow. Other arrangements are contemplated as well.

The thermal conductor 220 may include one or more openings 406. The openings 406 may be circumferentially disposed in the cylindrical upper portion 402 of the thermal conductor 220 and may be fluidly coupled to the central bore 408, 412. These openings 406 may serve as condensate water inlets and receive the condensate water as it drains from the lower housing 202. Although six water inlets are depicted in FIGS. 15, 16 and 17, other quantities of water inlets are also contemplated, such as, for example, two, three, four, eight, etc. An opening 410 at a bottom of the thermal conductor 220 may serve as the condensate water exit.

Accordingly, the thermal conductor 220 may be thermally coupled to the heating element 252 directly, through the threaded shaft 304 of the thermal coupler 210 or the like. The thermal coupling may ensure that the thermal conductor 220 is transferred heat from heating element 252 and maintains a temperature above freezing even when the ambient temperature is below freezing. Additionally, the central bore 408 may be fluidly coupled to the desiccant chamber 246 via the lower housing 202.

Figure 18:
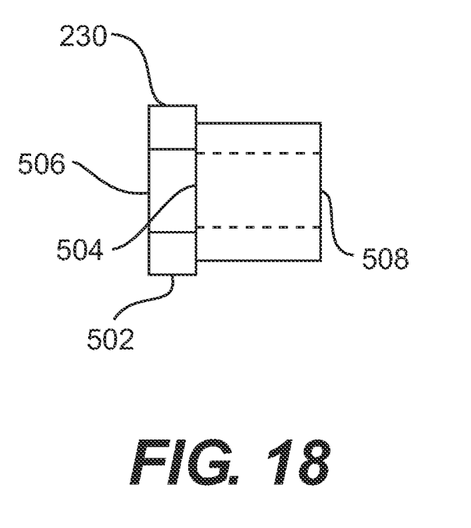
FIG. 18 is a side view of a vent according to an aspect of the invention.
Figure 19:
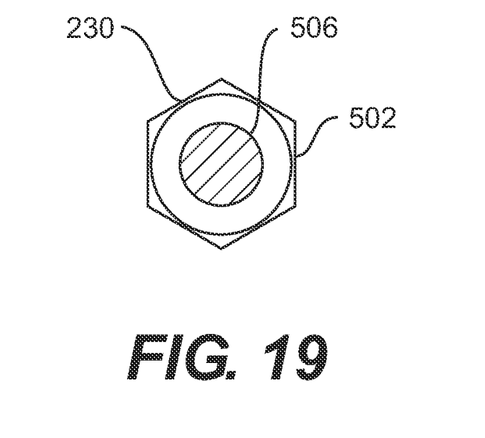
FIG. 19 is a bottom view of the vent according to the aspect of the invention shown in FIG. 18.
Figure 20:
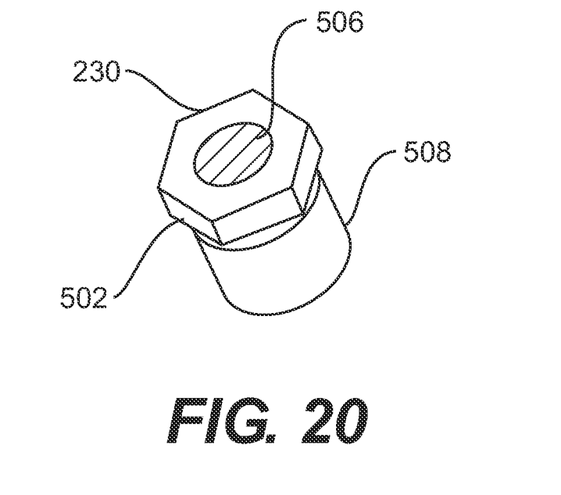
FIG. 20 is a bottom perspective view of the vent according to the aspect of the invention shown in FIG. 18.

FIG. 18 is a side view of a vent according to an aspect of the invention; FIG. 19 is a bottom view of the vent according to the aspect of the invention shown in FIG. 18; and FIG. 20 is a bottom perspective view of the vent according to the aspect of the invention shown in FIG. 18. In particular, FIGS. 18, 19 and 20 present side, bottom and bottom perspective views, respectively, of a condensate vent 230 according to an aspect of the invention. The condensate vent 230 may include an end cap 502. The end cap 502 may be configured with a hexagonal exterior shape to allow for construction, maintenance, and the like with common tools. However, other shapes are contemplated as well.

Figure 21:
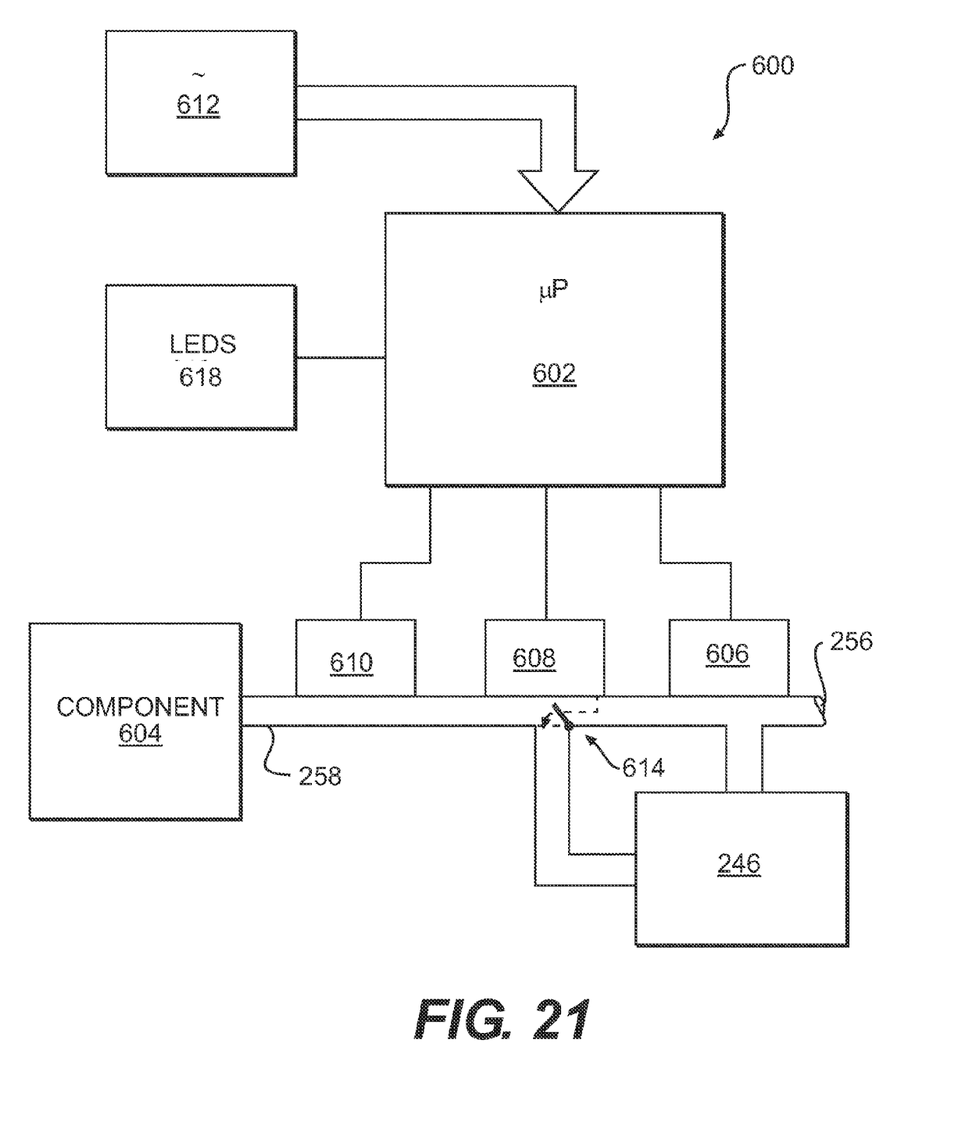
FIG. 21 shows a schematic diagram of a controller in conjunction with the recharging dehydrating breather according to an aspect the invention.

The condensate vent 230 may include a cylindrical threaded shaft 504 in a central bore extending therethrough as shown by the dashed lines. A screen 506 may be disposed over a bottom opening of the condensate vent 230. The screen 506 may prevent unwanted objects from entering the condensate vent 230. A top opening 508 may be configured to receive the cylindrical lower portion 404 of the thermal conductor 220 including the opening 410 that forms a water exit. Accordingly, the central bore of the condensate vent 230 may be fluidly coupled to the opening 410 that forms a water exit of the thermal conductor 220. In another aspect, the thermal conductor 220 may be attached directly to, or about, the heating element 252 and/or the heat distribution fin assembly 254, and the thermal coupler 210 is not present. accordingly, the condensate vent 230 a receipt heat from the heating element 252 directly or indirectly FIG. 21 shows a schematic diagram of the controller in conjunction with the recharging dehydrating breather of the invention. In particular, the recharging dehydrating breather may include a controller 600. The controller 600 may be located in the upper housing 242 or elsewhere in electronic communication with the dehydrating breather 200. The controller 600 may be configured on a printed circuit board (PCB) or the like. The controller 600 may include a microcontroller 602 and supporting circuitry. The controller 600 may include a humidity sensor 606, a vacuum sensor switch 610, and a power supply 612.

The controller 600 may include LED indicators 618. The LED indicators 618 may output various status indications of the controller 600 or the dehydrating breather 200 such as power, input/output port operation and the like. The humidity sensor 606 may sense the relative humidity of the air inhaled by the component 604 through the desiccant chamber 246. The vacuum sensor switch 610 may sense whether the component is attempting to inhale while coupled to the vent port 256 during regeneration. Additionally, the controller 600 may actuate a solenoid valve 608. The solenoid valve 608 in turn may operate a valve 614. Other arrangements of the controller 600 are contemplated and are within the spirit and scope of the invention.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

The invention claimed is:

1. A recharging dehydrating breather for providing dehydrated air to electrical components comprising:
    a desiccant chamber configured to hold desiccant and further configured to dehydrate air that is provided to the electrical components;
    a heating element configured to heat the desiccant held in the desiccant chamber to at least partially eliminate water;
    a housing configured to hold the desiccant chamber and the heating element;
    an outlet configured to provide an outlet to guide the water away from the housing; and
    a thermal coupler that abuts the heating element to conduct heat from the heating element to the outlet and an exterior surface of the outlet, the outlet and the exterior surface of the outlet configured to be heated by the heating element.

2. The recharging dehydrating breather of claim 1, wherein the thermal conductor includes a water inlet fluidly coupled to the desiccant chamber.

3. The recharging dehydrating breather of claim 2, wherein the thermal conductor comprises a central bore and a water exit.

4. The recharging dehydrating breather of claim 1, wherein the outlet comprises a condensate vent that includes a central bore and a screen.

5. The recharging dehydrating breather of claim 1, wherein the thermal coupler abuts a bottom of the heating element.

6. The recharging dehydrating breather of claim 1, wherein the outlet comprises a disk that abuts a bottom of the heating element and a shaft that connects to a thermal conductor.

7. The recharging dehydrating breather of claim 1, wherein the desiccant chamber further comprises one or more of heating fins associated with the heating element, a cylindrically shaped mesh housing, and a screen bottom portion.

8. The recharging dehydrating breather of claim 1, wherein the outlet comprises:
    the thermal conductor configured to be thermally coupled to the heating element, the thermal conductor including a water inlet fluidly coupled to the desiccant chamber;
    a condensate vent that includes a central bore and a screen; and
    the thermal coupler abuts a bottom of the heating element.

9. The recharging dehydrating breather of claim 8, wherein the thermal conductor comprises a central bore and a water exit; and the thermal coupler includes a disk that abuts a bottom of the heating element and a shaft that connects to the thermal conductor.

10. The recharging dehydrating breather of claim 1, wherein the outlet and the exterior surface of the outlet are configured to be heated by the heating element to reduce at least one of freezing, frost, or ice formation on the exterior surface of the outlet.

11. The recharging dehydrating breather of claim 1, further comprising:
    a connector arranged between the electrical components and the housing;
    the connector configured to direct airflow from the electrical components through the connector to vent air to the atmosphere when the electrical components exhale; and
    the connector configured to receive airflow through the desiccant and direct the airflow to the electrical components when the electrical components inhale.

12. A recharging dehydrating breather for providing dehydrated air to electrical components comprising:
    chamber means for holding desiccant and dehydrating air that is provided to the electrical components;
    heating means for heating the desiccant held in the chamber means to at least partially eliminate water;
    means for housing the chamber means and the heating means;
    outlet means to provide an outlet to guide the water away from the means for housing; and
    a thermal coupler that abuts the heating means to conduct heat from the heating means to the outlet means and an exterior surface of the outlet means, the outlet means and the exterior surface of the outlet means being heated by the heating means.

13. The recharging dehydrating breather of claim 12, wherein the outlet means comprises the thermal conductor thermally coupled to the heating means, the thermal conductor including a water inlet fluidly coupled to the chamber means.

14. The recharging dehydrating breather of claim 12, wherein the outlet means comprises a condensate vent that includes a central bore and a screen.

15. The recharging dehydrating breather of claim 12, wherein the thermal coupler abuts a bottom of the heating means.

16. The recharging dehydrating breather of claim 12, wherein the chamber means further comprises one or more of heating fins associated with the heating means, a cylindrically shaped mesh housing, and a screen bottom portion.

17. The recharging dehydrating breather of claim 12, wherein the outlet means comprises:
    the thermal conductor thermally coupled to the heating means, the thermal conductor including a water inlet fluidly coupled to the chamber means;
    a condensate vent that includes a central bore and a screen; and the thermal coupler abuts a bottom of the heating means.

18. The recharging dehydrating breather of claim 17, wherein the thermal conductor comprises a central bore and a water exit; and the thermal coupler includes a disk that abuts a bottom of the heating means and a shaft that connects to the thermal conductor.

19. The recharging dehydrating breather of claim 12, wherein the outlet means and the exterior surface of the outlet means are heated by the heating means to reduce at least one of freezing, frost, or ice formation on the exterior surface of the outlet.

20. The recharging dehydrating breather of claim 12, further comprising:
- a connector arranged between the electrical components and the housing means;
- the connector configured to direct airflow from the electrical components through the connector to vent air to the atmosphere when the electrical components exhale; and
- the connector configured to receive airflow through the desiccant and direct the airflow to the electrical components when the electrical components inhale.

* * * * *